United States Patent
Zucker et al.

(10) Patent No.: US 12,400,225 B2
(45) Date of Patent: Aug. 26, 2025

(54) SYSTEMS AND METHODS FOR BEACON AND CLOUD PAYMENTS

(71) Applicant: NCR Voyix Corporation, Atlanta, GA (US)

(72) Inventors: Brent Vance Zucker, Roswell, GA (US); Yehoshua Zvi Licht, Alpharetta, GA (US)

(73) Assignee: NCR Voyix Corporation, Atlanta, GA (US)

( * ) Notice: Subject to any disclaimer, the term of this patent is extended or adjusted under 35 U.S.C. 154(b) by 190 days.

(21) Appl. No.: 15/445,284

(22) Filed: Feb. 28, 2017

(65) Prior Publication Data
US 2018/0247307 A1    Aug. 30, 2018

(51) Int. Cl.
| | |
|---|---|
| G06Q 20/40 | (2012.01) |
| G06Q 20/20 | (2012.01) |
| G06Q 20/32 | (2012.01) |
| G06Q 50/06 | (2024.01) |

(52) U.S. Cl.
CPC ........... *G06Q 20/40* (2013.01); *G06Q 20/202* (2013.01); *G06Q 20/3223* (2013.01); *G06Q 20/3224* (2013.01); *G06Q 20/327* (2013.01); G06Q 50/06 (2013.01)

(58) Field of Classification Search
CPC ............... G06Q 20/322; G06Q 20/327; G06Q 20/3278; G06Q 20/401; G06Q 20/405; G06Q 20/10; G06Q 20/20; G06Q 20/3224

See application file for complete search history.

(56) References Cited

U.S. PATENT DOCUMENTS

| | | | | |
|---|---|---|---|---|
| 2013/0110296 A1* | 5/2013 | Khoo | ...................... | B60L 53/31 700/286 |
| 2014/0006188 A1* | 1/2014 | Grigg | ................. | G06Q 20/3276 705/17 |
| 2014/0335897 A1* | 11/2014 | Clem | ...................... | G08G 1/147 455/456.3 |
| 2015/0170135 A1* | 6/2015 | Fourez | ................... | G06Q 20/40 705/21 |

(Continued)

FOREIGN PATENT DOCUMENTS

| | | | | |
|---|---|---|---|---|
| AU | 2013222118 A1 * | 9/2014 | ........... | G06Q 20/204 |
| WO | WO-2016082687 A1 * | 6/2016 | ............. | G07B 15/06 |

OTHER PUBLICATIONS

Https://www.paymet.com/gas-station-payments.html (Year: 2016).*

Primary Examiner — Ariel J Yu
(74) Attorney, Agent, or Firm — Schwegman Lundberg & Woessner, P.A.

(57) ABSTRACT

Disclosed herein are systems and method comprising: transmitting, by a point-of-sale system, a beacon identifier receivable by a mobile device; and receiving, by the point-of-sale system and without interaction by a user of the mobile device, payment information associated with the user, the payment information authorizing payment for the product. Further disclosed are systems and methods comprising: receiving, at a mobile device, a beacon identifier from a point-of-sale system, the beacon identifier associated with a product; and transmitting, by the mobile device and without interaction by a user of the mobile device, payment information associated with the user, the payment information authorizing payment for the product.

5 Claims, 3 Drawing Sheets

(56) References Cited

U.S. PATENT DOCUMENTS

| | | | |
|---|---|---|---|
| 2015/0227928 A1* | 8/2015 | Patel | G06Q 20/32 |
| | | | 705/71 |
| 2015/0228017 A1* | 8/2015 | Momin | G06Q 40/03 |
| | | | 705/38 |
| 2016/0182170 A1* | 6/2016 | Daoura | H04W 12/033 |
| | | | 455/3.01 |
| 2017/0061511 A1* | 3/2017 | Korra | H04W 4/029 |
| 2017/0076265 A1* | 3/2017 | Royyuru | G06Q 20/18 |
| 2017/0114958 A1* | 4/2017 | Otaki | F17C 13/026 |
| 2017/0127230 A1* | 5/2017 | Enriquez | H04L 67/18 |
| 2018/0114217 A1* | 4/2018 | Kohli | G06Q 10/109 |

* cited by examiner

SYSTEMS AND METHODS FOR BEACON AND CLOUD PAYMENTS

BACKGROUND

Currently, in order to pay for something a consumer must retrieve a form of payment and interact with a either a cashier or other self-service terminal. For example, when a consumer wants to purchase fuel for his or her automobile, he or she must interact with the pump or go into the store to first pay for the fuel. In a retail environment the consumer or a cashier is required to scan or otherwise enter product information into a point-of sale (POS) system and the consumer must produce a form of payment to be entered into the POS system as well.

SUMMARY

Disclosed herein are systems and method comprising: transmitting, by a point-of-sale system, a beacon identifier receivable by a mobile device; and receiving, by the point-of-sale system and without interaction by a user of the mobile device, payment information associated with the user, the payment information authorizing payment for the product. Further disclosed are systems and methods comprising: receiving, at a mobile device, a beacon identifier from a point-of-sale system, the beacon identifier associated with a product; and transmitting, by the mobile device and without interaction by a user of the mobile device, payment information associated with the user, the payment information authorizing payment for the product.

BRIEF DESCRIPTION OF THE FIGURES

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention any manner.

DETAILED DESCRIPTION

Figure 1:
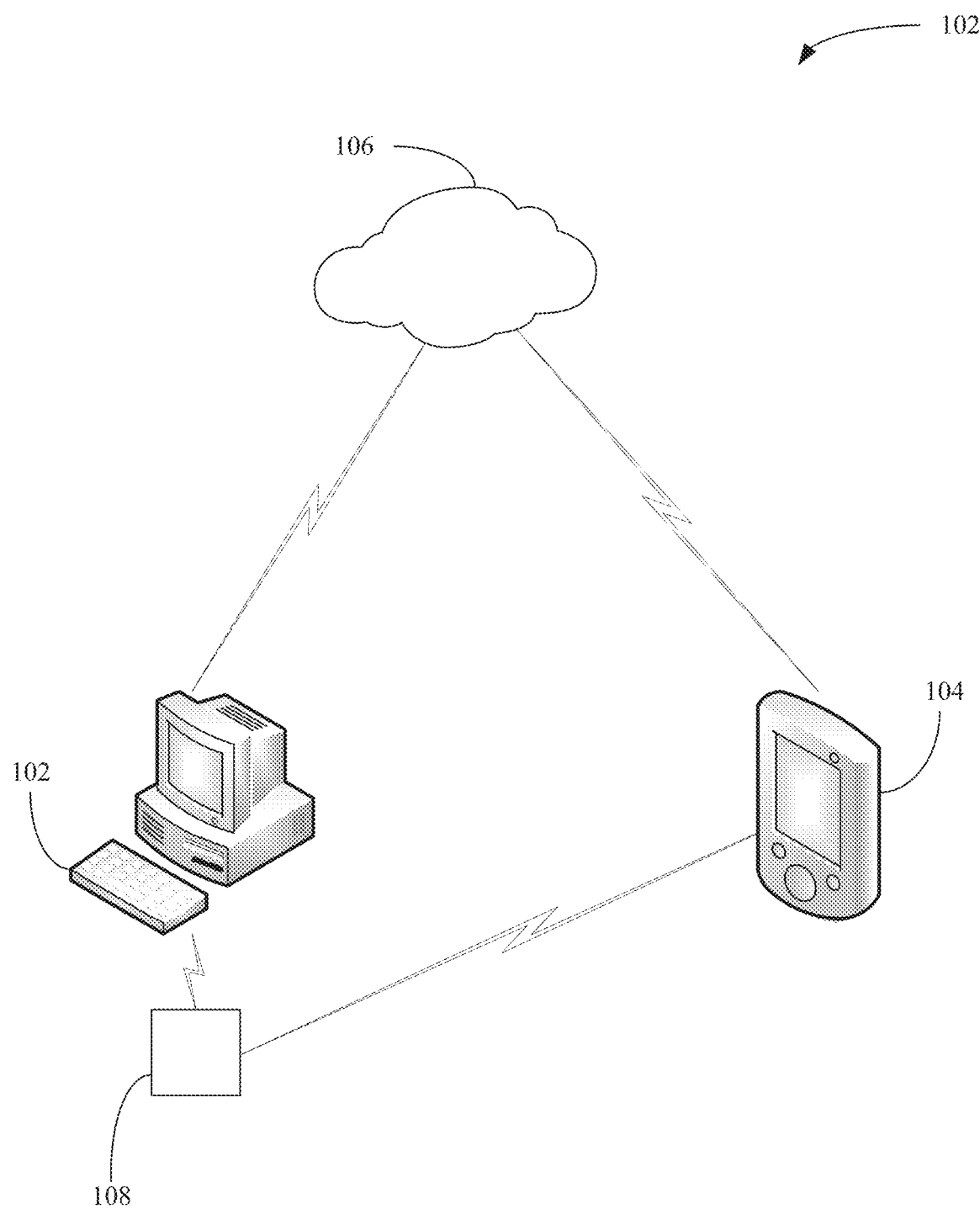
FIG. 1 shows an operating environment for consistent example embodiments disclosed herein.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the discloses systems. Accordingly, the following detailed description does not limit the disclosure. Instead, the proper scope of any invention disclosed herein is defined by the appended claims.

Traditional point-of-sale (POS) systems require that a customer produce and physically interact with a tangible form of payment (e.g., cash, credit card, check, smart phone for Apple Pay®, etc.) in order to purchase goods or services. This is inefficient. For example, a traditional fuel pump requires that a user produce a credit card or go inside and pay with a tangle form of payment before the driver can dispense fuel. During busy times (e.g., rush hour), long lines can occur at the pumps. Lines can get even longer when customers who are filling up go inside the store and overestimate how long it will take to fill their gas tanks because they do not realize the tanks are full and move their cars so others can use the pumps. This wastes customers' time while simultaneously hurting the business because idle pumps represent lost revenue.

As disclosed herein, POS systems may be outfitted with a beacon. The beacon can interact with mobile devices such as, but not limited to, smart phones, smart watches, smart cars, etc. The POS systems also may be connected to a network, or cloud system. The beacon and network or cloud system may allow the POS system to communicate with the mobile device. The communications between the POS system and the mobile device may greatly increase efficiency by allowing mobile device and POS system to interact with one another without any direct input from the user. Stated another way, the transaction can occur in the background without the consumer having to interact with the POS system, cashier, or otherwise produce a tangible form of payment.

Using a fuel pump as an example, a user may approach the pump and a beacon connected to the pump may alter the user's mobile device that the user is at a gas station. The user's mobile device can then transmit, via the cloud, payment information to the pump without the consumer having to produce a credit card, press a button on his or her mobile device, or otherwise interact with the pump other that placing the filling nozzle in the automobile.

As disclosed herein, the POS system and the mobile device can exchange information to facilitate the transaction. For example, the mobile device, which may be the car itself, may transmit how much fuel is needed to fill the car up and credit card information to the pump. The pump may then authorize the dispensing of a preset amount of gas needed to fill the car up. Once the preset amount of gas is dispensed or the automatic shutoff of the pump activated, the POS may send a notification to the mobile device indicating that the transaction is complete with details of the transaction (i.e., amount of gas dispensed and total cost).

Also, based on the flow rate of the pump and the desired amount of fuel needed, the pump may transmit an estimated time needed to fill up the car. As a result, the user may be able to better judge how long he or she may shop in the store without needlessly tying up a pump when the car is full. As disclosed herein, other POS systems besides fuel pumps may utilize beacons and cloud technology to improve payment efficiency.

Turning now to the figures, FIG. illustrates an example schematic of an operating environment 100 consistent with embodiments disclosed herein. As shown in FIG. 1, the operating environment 100 may include a POS system 102 and a mobile device 104 in communication with one another via a network 106. Also as shown in FIG. 1, the POS system 102 may include a beacon 108. While FIG. 1 shows a single POS system, multiple POS systems may be included in the operating environment 100. For example, when the operating environment 100 is a gas station, POS system 102 may be a pump and there may be multiple pumps located at the station. If the operating environment is a traditional brick and mortar retailer, the POS system 102 may be a cash register or other terminal capable of processing payments.

During operation, as the customer approaches the POS system 102, the mobile device 104 may receive a beacon identifier transmitted by the POS system 102. The beacon identifier may include data that distinctly identifies the POS system 102 from a plurality of POS systems. Upon receiving the beacon identifier, the mobile device 104 may transmit, via the network 106, payment information to the POS system 102. The payment information may include credit or debit card information, a desired quantity of a product, a maximum amount of money that may be spent for a product, etc. The desired quantity of the product and the maximum amount of money that may be spent for the product may be based on a price of the product.

In addition, the POS system 102 may transmit, via the network 106, product data or other information to the mobile device 104. For example, the POS system 102 may transmit a price for a product, an estimate of a total purchase price, a time to complete a transaction, etc. Once a transaction has been completed, the POS system 102 may transmit a notification to the mobile device that the transaction is complete. For example, the POS system 102 may transmit an electronic receipt to the mobile device.

As disclosed herein, the POS system 102 may be any type of system capable of processing a purchase transaction. Non-limiting examples of the POS system 102 include a cash register, a self-service terminal, a self-service kiosk, a fuel pump, etc. In addition to traditional POS systems, the POS system 102 may include a computing device coupled to transmitter, receiver, or transceiver capable of exchanging information with the mobile device 104, and not readily apparent or visible to the customer. For example, as disclosed herein, the POS system 102 may be a computing device located in a back area of a store (or even offsite) coupled to a transceiver located proximate an entrance to the store. As the mobile device 104 enters the store, a beacon or beacons located proximate the entrance or throughout the store may send beacon identifiers to the mobile device 104. Upon receiving the beacon identifiers, the mobile device may transmit a signal, via the network 106, to the POS system 102 to begin a transaction or other exchange of product or payment data.

The mobile device 104 may be any portable electronic device associated with a customer. Non-limiting examples of the mobile device 104 include a cellphone, smart phone, table computer, phablet, smart watch, smart car, etc. For instance, a car may have the capability to communicate with other devices via the Internet or other networks disclosed herein and have an onboard computing device capable of transmitting, receiving, and otherwise processing data. As such, the car may be considered a smart car. As the car approaches the POS system 102 (for instance, a fuel pump) the car and the POS system 102 may exchange information as disclosed herein.

The network 106 may be any network capable of data transmission. Non-limiting examples of the network 106 include the Internet, cellular networks, peer-to-peer networks, wide area networks (WAN), local area networks (LAN), ad-hoc networks created by the mobile device 104 and the POS system 102, or any combinations thereof. For example, the network may include a cellular network that a cellphone (i.e., the mobile device 104) used to connect to the Internet, which connects to a LAN to which a cash register (i.e., the POS system 102) is connected.

The beacon 108 may be BLUETOOTH® beacons, WI-FI® hotspots, routers, etc. that allow the POS system 102 to broadcast the beacon identifier such that the mobile device may receive the beacon identifier. The power or range of the beacon 108 may depend on an application. For example, beacons associated with fuel pumps may have a short range (e.g., about 2 to 5 feet) and beacons for a brick and mortar retail store may have a longer range (e.g., about 10 to 20 feet or more). In addition, where the range of beacons may cause overlap of beacon identifiers, signal strength may be used to determine to which beacon the mobile device may be closer. For example, if the mobile device detects a first beacon identifier from a first beacon and a second beacon identifier from a second beacon, an app operating on the mobile device 104 may determine that the signal strength for the first beacon identifier is stronger than the signal strength for the second beacon identifier. Thus, the app may choose the first beacon as the closest beacon and initiate data exchange with the first beacon instead of the second beacon.

Non-limiting examples of the operating environment 100 can include a gas station and a brick and mortar retail establishment. In a gas station context, the system may operate as follows. A car may pull up to a pump and the mobile device 104 (e.g., the car, the driver's cellphone or smart watch) may detect the beacon identifier emitted from the beacon 108. Upon detecting the beacon identifier, the mobile device 104 may initiate communications with the POS system 102 via the network 106. Once the connection is established, the POS system 102 may transmit price information about the various grades of gas offered. For example, the POS system 102 may transmit that regular unleaded is $2.50/gallon and premium unleaded is $2.80/gallon.

Based on the price of the gas, the mobile device may transmit an amount of gas to be purchased. For example, if the price of regular unleaded is less than or equal to $2.75/gallon the mobile device 104 may transmit that the pump is to dispense gas until the pump's automatic shutoff stops the flow of gas. In other words, the pump is to dispense gas until the car is full. If the price is above the preset value the mobile device 104 may transmit a request to purchase a preset amount of gas. For instance, if gas is above $2.60/gallon the mobile device 104 may transmit that only $20 worth of gas is to be dispensed. The automatic shutoff may override the preset amount for safety. For example, if the mobile device 104 authorizes $20 worth of gas to be purchased, but the car will only hold an addition, $10 work of gas, one the automatic shutoff stops the flow of gas, the POS system 102 may complete the transaction as selling only $10 worth of gas.

Still consistent with embodiments disclosed herein, the mobile device 104 may authorize a purchase without specifying an amount. For example, the beacon 108 may periodically transmit the beacon identifier. In other words, the beacon 108 may periodically ping the mobile device 104. The mobile device 104 may receive the beacon identifier and transmit data to the POS system 102 indicating that the user is continuing a purchase. As such, the pump may continue to dispense fuel as long as the mobile device 104 continues to receive the beacon identifier and transmit data to the POS system 102. Once the user is finished pumping gas and drives away, the mobile device 104 will no longer receive the period broadcast of the beacon identifier. After the loss of the beacon identifier reception, the mobile device 104 may transmit a data to the POS system 102 indicating that the transaction is complete. Once the transaction is complete, the POS system 102 may bill the user credit or debit card appropriately and transmit a push notification to the mobile device 104. The push notification may be an electronic receipt for the fuel purchase and may contain data indicating how much gas was purchased, the total cost for the purchase, any loyalty rewards (include a rewards balance) the user may have earned, etc.

As indicate herein, the car may be a smart car or otherwise coupled to a mobile device carried by the user. For example, the car may transmit data to the user's cellphone (e.g., via a Bluetooth® connection), which in turn may transmit data to the POS system 102. The data transmitted by the car or cellphone may include how many gallons of gas are needed to fill the car up. For instance, the onboard computer of the car may determine that 7.5 gallons of gas are needed to fill the fuel tank. As such, the car may transmit to the user's cellphone (or directly to the POS system 102) an authorization to purchase 7.5 gallons of gas.

With a known quantity of gas to be dispensed and a known flowrate of the fuel pump, the POS system 102 may transmit to the mobile device 104 an estimated time to complete the transaction. For example, if the POS system 102 knows the pump dispenses gas at 2 gallons per minute and 7.5 gallons are needed, then the POS system 102 may transmit data to the mobile device 104 indicating that the transaction may take approximately 3.75 minutes to complete. In addition, calculating the approximate time to complete the transaction, the mobile device 104 may display a countdown timer that indicates the estimated time to complete the transaction.

As indicated herein, the completion of the transaction may be indicated with the mobile device 104 leave a proximity to the POS system 102. Once the transaction is complete in addition to transmitting a notification to the mobile device 104, the POS system 102 may transmit a notification to a clerk or other attendant supervising the fuel pumps.

Still consistent with embodiments disclosed herein, the operating environment 100 may be a traditional brick and mortar retail establishment. In this context, the mobile device 104 may be a user's cellphone or smartwatch. The beacon 108 may be located proximate a cash register or other check station. In addition, the beacon 108 may connect to shopping cart. As such, when the user selects a cart, the mobile device 104 may transmit data to the POS system 102 coupling the cart to the user. The cart may also include a radio frequency identification (RFID) scanner. As the user places items in the cart, the RFID scanner may detect a RFID tag associated with the product. The RFID scanner may be in electrical communication with the beacon 108 or other transmitter associate with the POS system 102. As such, the RFID scanner or beacon 108 may transmit product data directly to the POS system 102 and the mobile device 104.

The product data may include a price for the product, expiration dates, budget categories, etc. An app running on the mobile device 104 may keep a running total of the user's purchases. The app may also include or interface with a budget program. As such, the app may alert the user the user if the user is spending more than the user has budgeted.

The cart may also include a scale system that monitors the weight of items placed in the cart. For example, the legs or basket of the cart may include strain gauges that can measure determine a weight of products added to the cart. As such, the cart may determine a cost for products sold be weight. For instance, if a user place two pounds of bananas or grapes in the cart, the strain gauges may detect a strain, which is converted to a weight by the POS system 102, the mobile device 104, or the cart itself, to determine a total price for the bananas or grapes by multiplying the weight by the price/pound.

The app running on the mobile device may include or interface with a shopping list app. As such, the user can create a shopping list while away from the store. While in the store, the mobile device 104 can use beacons located throughout the store to direct the user to the items on the shopping list. In addition, the app may suggest alternatives items. For example, the app may suggest a store or generic product as opposed to a brand name to increase sales of the store brand and save the user money. The app may also alert the user to sales that may be of interest to the user based on the items in the shopping cart.

The transaction can be completed when the mobile device 104 exits the store. POS system 102 or the mobile device 104 may determine that the mobile device 104 has exited the store in a variety of ways. For example, when the mobile device first initiates contact with the POS system 102, the POS system 102 may transmit coordinate data for a geofence that surrounds the store. Once the mobile device 104 detects that it is outside the geofence, the mobile device 104 may transmit a message to the POS system 102 indicated that the transaction is to be completed. The POS system 102 may then transmit a notification or other electronic receipt to the mobile device 104 to indicate the transaction has been completed. In addition, just as with the gas station example, the completion of the transaction can be indicated when the mobile device 104 no longer receives a beacon identifier associated with the cart or the store.

Regardless of the operating environment, retail store, gas station, etc. the systems and methods disclosed herein allow for transactions to occur automatically in the background without direct input from the user. As discussed herein, the systems and methods disclosed herein facilitate transactions without a consumer having to interact with a self-service terminal, cashier, or otherwise produce a tangible form of currency to complete a transaction. This represents a drastic improvement of current systems and methods for completing a transaction. The increase in efficiency by allowing consumers to autonomously complete transactions represents a huge advancement in the technology. This improves the operation of the hardware as well as uses the hardware in unconventional ways than previously imagined.

For example, in the brick and mortar store example above, the systems and methods disclosed herein may eliminate checkout lines, and more importantly, the time wasted standing in them. In the gas station example, the systems and methods disclosed herein may shave 2 or more minutes off of each consumers' time at the pump. The 2 or more minutes may result in a more consumers being able to purchase fuel, thereby increasing revenue for the station. For instance, if the average consumer spends 6 minutes at the pump, shortening that time by 2 minutes may allow an extra 5 customers to purchase fuel. For a stations with 10 to 20 pumps that could mean an extra 50 to 100 customers per hour.

Figure 2:
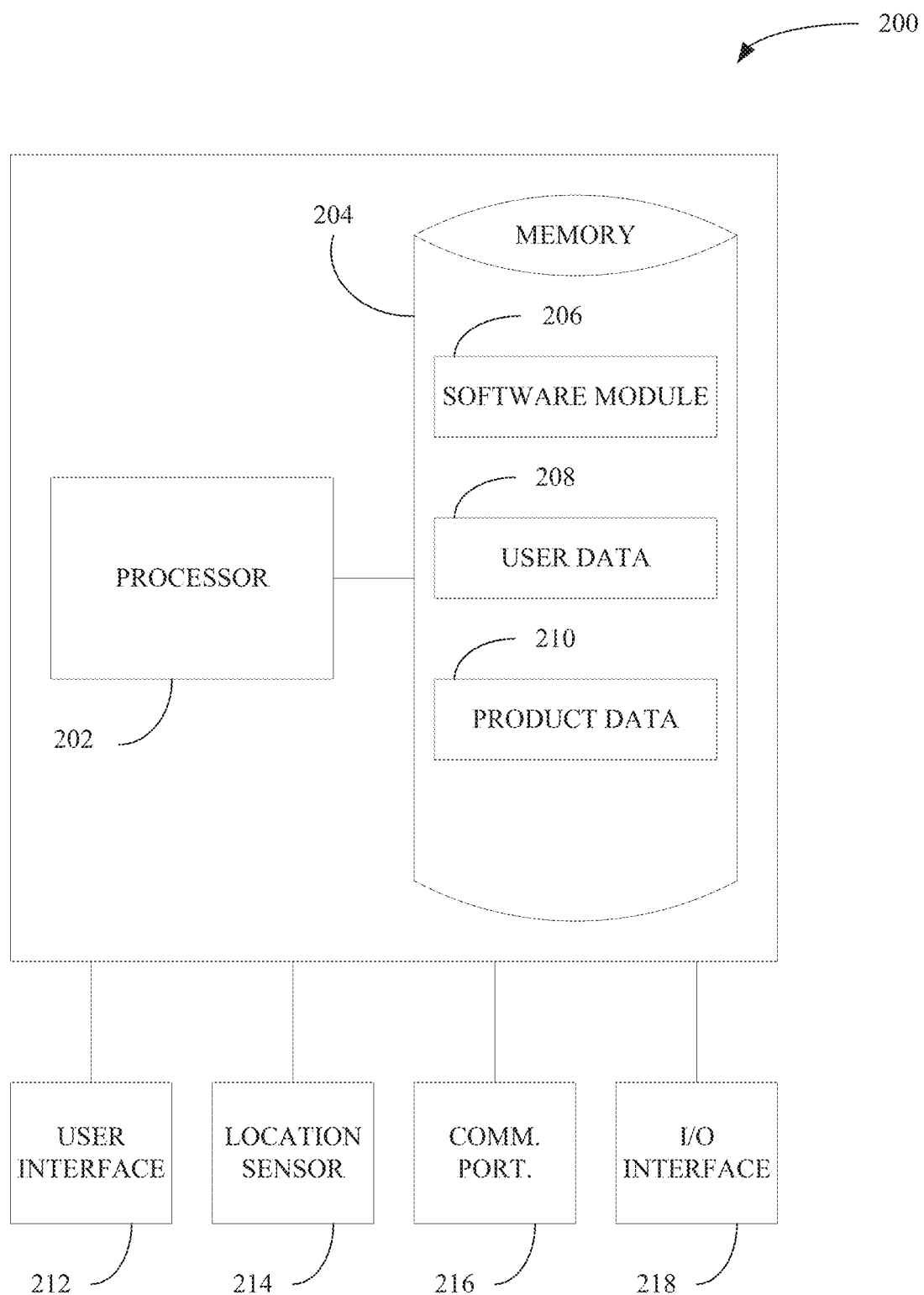
FIG. 2 shows an example schematic of a computing device consistent with example embodiments disclosed herein.

FIG. 2 shows an example schematic of a computing device 200. Computing device 200 may represent the POS system 102 or the mobile device 104. As shown in FIG. 2, the computing device 200 may include a processor 202 and a memory unit 204. The memory unit 204 may include a software module 206, user data 208, and product data 210. While executing on the processor 202, the software module 206 may perform processes for autonomously completing a transaction, including, for example, one or more stages included in method 300 described below with respect to FIG. 3.

The software module 206 may include data or applications used to operate the computing device 200. For example, if the computing device 200 is the POS system 102, the software module 206 may include applications that operate components of the computing device 200 as disclosed herein. In addition, the software module 206 may include applications for transmitting the notifications, completing the transactions, updating an inventory management system etc. For example, when a transaction is completed, the computing device may transmit the sales data to an inventory management system to decrement the inventor of the items purchased.

If the computing device 200 is the mobile device 104, the software module 206 may include applications that operate components of the computing device 200 as disclosed herein. For instance, the computing device 200 may execute application stored in the software module 206 to monitor for beacon signals, transmit user or payment information to the POS system 102, display the notification upon completion of the transaction, etc.

The user data 208 may include a user profile. The user profile may be created by a user of the mobile device 104. For example, the user may create a profile that includes clothing sizes, billing information (e.g., credit card numbers and billing addresses), gas preferences (e.g., regular unleaded v. premium unleaded), maximum prices to pay for items (e.g., prices for gas that warrant filling the tank v. buying a preset amount in the hopes that prices drop), budgets, shopping lists, etc. The user profile may also include loyalty rewards information such as usernames and passwords, account balances, etc.

The user profile may also be create by the POS system 102. For example, the POS system may supplement the user profile created by the user to include additional information. For instance, the user profile may include spending trends, favorite brands, most commonly purchased items, etc. The user profile may be analyzed for marketing purposes or to better understand customer behaviors to improve customer service. The user profile may also include loyalty rewards information such as usernames and passwords, account balances, etc.

The product data 210 may include prices for goods and services, sales data e sales trends), discounts, rewards credits for items, etc. The product data may also include information about the dispenser of the product. For example, the product data may include flowrate data for a gas pump, tare weights for produce containers, etc.

The computing device 200 may also include a user interface 212. The user interface 212 can include any number of devices that allow a user to interface with the computing device 200. Non-limiting examples of the user interface 212 include a keypad, a microphone, a display (touchscreen or otherwise), etc.

The computing device 200 may also include a location sensor 214. The location sensor 214 can include any number of devices that provides information to allow the computing device 200 to determine its location. A non-limiting example of the location sensor 214 includes a GPS receiver, beacon receivers, etc.

The computing device 200 may also include a communication port 216. The communication port 216 may allow the computing device 200 to communicate with the beacon 108 and the network 106 as described herein. Non-limiting examples of the communication port 216 include, Ethernet cards (wireless or wired), BLUETOOTH® transmitters and receivers, near-field communications modules, cellular transmitters and receivers, etc.

The computing device 200 may also include an input/output (UO) device 218. The I/O device 218 may allow the computing device 200 to receive and output information. Non-limiting examples of the I/O device 218 include, a camera (still or video), a printer, a scanner, scales, RFID readers, etc.

As disclosed herein, the computing device 200 may be implemented using a personal computer, a network computer, a mainframe, a handheld device, a personal digital assistant, a smartphone, smartwatch, tablet, phablet, or any other similar microcomputer-based workstation.

Figure 3:
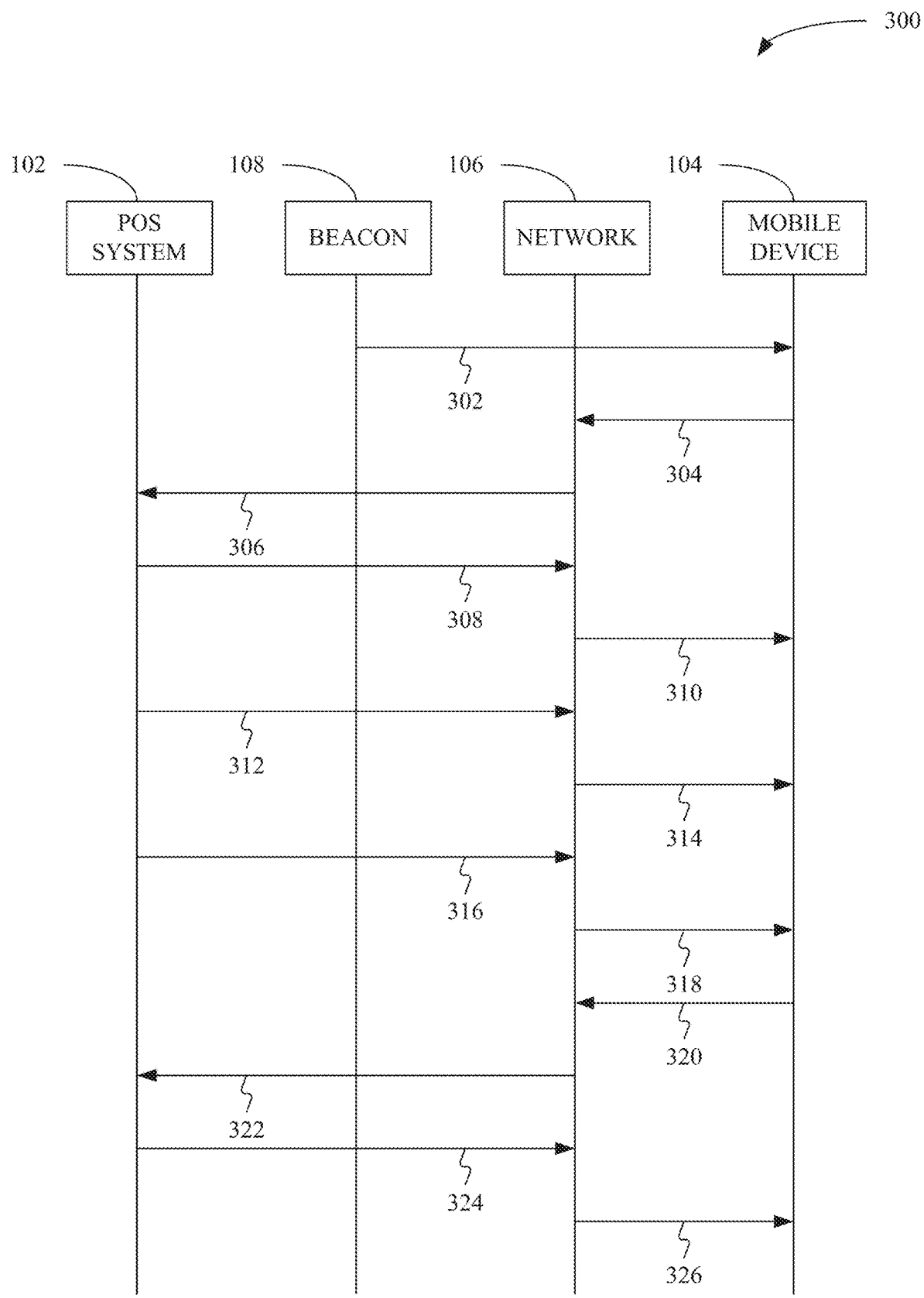
FIG. 3 shows an example flowchart for a method consistent with example embodiments disclosed herein.

FIG. 3 shows an example flowchart for a method 300 consistent with example embodiments disclosed herein. As shown in FIG. 3, the beacon 108 may broadcast a beacon identifier that may be received by the mobile device 104 (line 302). Once the mobile device 104 detects the beacon 108, the mobile device 104 may transmit user data and payment information authorizing payment for a product via the network 106 to the POS system 102 (lines 304 and 306). As disclosed herein, the user data and payment information may be how much as is to be purchased, a request for product information, a shopping lists, etc.

Prior to or after, depending on the configuration of the system and the operating environment, the POS system 102 may transmit product data, via the network 106, to the mobile device (lined 308 and 310). For example, in a gas station setting, the POS system 102 may push price data to the mobile device 104 prior to the mobile device authorizing a payment. Still consistent with a gas station setting, upon detecting the beacon 108, the mobile device 104 may authorize payment for any amount of gas without regard to the price. In a retail store setting, as a user places a product in the cart, the mobile device may request product information (e.g., price). Only after the user has exited the store, or reached a predetermined spot within the store that indicates the user is done shopping, may the mobile device 104 transmit the payment authorization.

Once payment has been authorized, the POS system 102 may transmit data, via the network 106, to the mobile device 104 indicating that dispensing can occur and how much is being dispensed (lines 312 and 314). For example, in the gas station setting, the pump may transmit an indication that the pump is dispensing gas and the rate it is being dispended to the user's cellphone or directly to the car itself (if the car is the mobile device 104). If the user's cellphone is the mobile device 104, the cellphone may further transmit data to the car (via Bluetooth® or other near-field-communication protocol) indicating how much gas is being deposited in the gas tank.

The mobile device 104 may lose the ability to detect the beacon 108. For example, the stages represented by lines 302, 304, and 306 may periodically repeat. When one of those stages is interrupted (i.e., the mobile device 104 is no longer proximate the beacon 108), the POS system 102 may complete the transaction by charging the user's payment method and send a notification, via the network 106, to the mobile device 104 as disclosed herein indicating the transaction is complete (lines 314 and 318).

In the alternative, the mobile device 104 may transmit, via the network 106, a signal to the POS system 102 indicating the transaction is to be completed (lines 320 and 322). Once the POS system 102 completes the transaction, the POS system 102 may transmit, via the network 106, a notification or electronic receipt to the mobile device 104 indicating that the transaction is complete (lines 324 and 326).

Additional examples and embodiments:

Example 1 is a method comprising: transmitting, by a beacon associated with a point-of-sale system, a beacon identifier receivable by a mobile device; receiving, by the point-of-sale system and without interaction by a user of the mobile device, payment information associated with the user, the payment information authorizing payment for a product.

In Example 2, the subject matter of Example 1 optionally includes wherein the point-of-sale system is a fuel pump.

In Example 3, the subject matter of any one or more of Examples 1-2 optionally include wherein the product is gasoline or diesel.

In Example 4, the subject matter of any one or more of Examples 1-3 optionally include wherein the mobile device is a smart phone, a smart watch, or a smart automobile.

In Example 5, the subject matter of any one or more of Examples 1-4 optionally include transmitting, by the point-of-sale system, a price of the product to the mobile device.

In Example 6, the subject matter of Example 5 optionally includes wherein receiving the payment information includes receiving a desired quantity of the product to be purchased based on the price of the product.

In Example 7, the subject matter of any one or more of Examples 1-6 optionally include transmitting, by the point-of-sale system, a push notification to the mobile device, the push notification indicating an amount of the product purchased and that the purchase is complete.

In Example 8, the subject matter of Example 7 optionally includes periodically receiving a ping acknowledgement from the mobile device once the mobile device receives the beacon identifier, wherein the push notification is transmitted to the mobile device when the point-of-sale system does not receive the ping acknowledgement from the mobile device within a preset time interval.

Example 9 is a method comprising: receiving, at a mobile device from a beacon, a beacon identifier from a beacon associated with a point-of-sale system; and transmitting, by the mobile device and without interaction by a user of the mobile device, payment information associated with the user, the payment information authorizing payment for a product.

In Example 10, the subject matter of Example 9 optionally includes wherein the point-of-sale system is a fuel pump.

In Example 11, the subject matter of any one or more of Examples 9-10 optionally include wherein the product is gasoline or diesel.

In Example 12, the subject matter of any one or more of Examples 9-11 optionally include wherein the mobile device is a smart phone, a smart watch, or a smart automobile.

In Example 13, the subject matter of any one or more of Examples 9-12 optionally include receiving, at the mobile device, a price of the product.

In Example 14, the subject matter of Example 13 optionally includes wherein transmitting the payment information includes authorizing a fixed amount of the product to be purchased based on the price of the product.

In Example 15, the subject matter of Example 14 optionally includes wherein the fixed amount of the product to be purchased is transmitted to the point-of-sale system.

In Example 16, the subject matter of any one or more of Examples 9-15 optionally include receiving, at the mobile device, a push notification indicating an amount of the product purchased and that the purchase is complete.

Example 17 is a system comprising: a beacon; a receiver; a processor in electrical communication with the transmitter and the receiver; and a memory that stores instructions that, when executed by the processor, cause the processor to: transmit, via the beacon, a beacon identifier receivable by a mobile device, and receiving, via the receiver and without interaction by a user of the mobile device, payment information associated with the user, the payment information authorizing payment for a product.

In Example 18, the subject matter of Example 17 optionally includes wherein the system is a component of a fuel pump and the product is gasoline or diesel.

In Example 19, the subject matter of any one or more of Examples 17-18 optionally include wherein the operations further cause the processor to: transmit, via a transmitter, a price of the product to the mobile device; and receive a desired quantity of the product based on the price of the product.

In Example 20, the subject matter of any one or more of Examples 17-19 optionally include wherein the operations further cause the processor to: periodically receiving a ping acknowledgment from the mobile device once the mobile device receives the beacon identifier; and transmit a push notification to the mobile device, the push notification indicating an amount of the product purchased and that the purchase is complete, wherein the push notification is transmitted to the mobile device when the point-of-sale system does not receive the ping acknowledgement from the mobile device within a preset time interval.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   transmitting, by a beacon associated with a point-of-sale system, a beacon identifier to a mobile device in proximity to the point-of-sale system, wherein the point-of-sale system is associated with a fuel pump;
   receiving, by the point-of-sale system and without interaction by a user of the mobile device, payment information associated with the user, wherein the payment information authorizes a payment for a product wherein the payment information is received by the mobile device from an onboard computer of an automobile, via a first wireless connection, and wherein the mobile device sends the payment information to the point-of-sale system, via a second wireless connection, without the user interacting with the onboard computer or without interacting with the mobile device;
   transmitting, by the point-of-sale system, a push notification to the mobile device, the push notification indicating an amount of the product purchased and indicating that a purchase is complete;
   transmitting, by the point-of-sale system to the mobile device, an estimated time to complete a transaction associated with the payment for the product, the estimated time being a function of a flow rate of the fuel pump and the amount of fuel needed; and
   transmitting, by the point-of-sale system, a notification to a clerk supervising the point-of-sale system and the mobile device, the notification indicating the transaction is complete, wherein the notification is presented on a display visible to the clerk.

2. The method of claim 1, wherein the product is gasoline or diesel.

3. The method of claim 1, wherein the mobile device is a smart phone, a smart watch, or a smart automobile.

4. The method of claim 1, further comprising transmitting, by the point-of-sale system, a price of the product to the mobile device.

5. A system comprising:
   a beacon;
   a receiver;
   a transmitter;
   a processor in electrical communication with the beacon, the transmitter, and the receiver; and
   a memory that stores instructions that, when executed by the processor, cause the processor to perform operations comprising:
   transmitting, via the beacon, a beacon identifier receivable to a mobile device in proximity to a point-of-sale system associated with the system, wherein the point-of-sale system is associated with a fuel pump,
   receiving, via the receiver and without interaction by a user of the mobile device, payment information associated with the user, wherein the payment information authorizes a payment for a product, wherein the product being an amount of fuel needed determined by an onboard computer of an automobile and communicated by the onboard computer, via a first wireless connection, to the mobile device and from the mobile device communicated, via a second wireless connection, to the point-of-sale system without the user interacting with the onboard computer or without the user interacting with the mobile device;
   transmitting a push notification to the mobile device, the push notification indicating an amount of the product purchased and indicating that a purchase is complete; and
   transmitting, by the transmitter, a notification to a clerk supervising the point-of-sale system and the mobile device, the notification indicating a transaction is complete, wherein the notification is presented on a display visible to the clerk.

* * * * *